(12) United States Patent
Trappe et al.

(10) Patent No.: US 6,754,587 B1
(45) Date of Patent: Jun. 22, 2004

(54) METHOD FOR PROCESSING SEISMIC DATA

(75) Inventors: Henning Trappe, Isernhagen (DE); Carsten Hellmich, Hannover (DE); Marc Föll, Hannover (DE)

(73) Assignee: Henning Trappe, Isernhagen (DE)

( * ) Notice: Subject to any disclaimer, the term of this patent is extended or adjusted under 35 U.S.C. 154(b) by 0 days.

(21) Appl. No.: 10/030,865

(22) PCT Filed: Jun. 15, 2000

(86) PCT No.: PCT/DE00/02000

§ 371 (c)(1),
(2), (4) Date: Jan. 14, 2002

(87) PCT Pub. No.: WO01/06277

PCT Pub. Date: Jan. 25, 2001

(30) Foreign Application Priority Data

Jul. 19, 1999 (DE) .......................... 199 33 717

(51) Int. Cl.$^7$ ............................................. G06F 19/00
(52) U.S. Cl. ........................................... 702/10; 702/16
(58) Field of Search ..................................... 702/10, 16

(56) References Cited

U.S. PATENT DOCUMENTS

| | | | | |
|---|---|---|---|---|
| 5,487,001 A | * | 1/1996 | Neff .............................. | 702/14 |
| 5,563,949 A | * | 10/1996 | Bahorich et al. ............. | 702/16 |
| 5,706,194 A | | 1/1998 | Neff et al. | |
| 5,838,564 A | * | 11/1998 | Bahorich et al. ............. | 702/16 |
| 5,892,732 A | * | 4/1999 | Gersztenkorn ............... | 367/72 |
| 5,940,778 A | * | 8/1999 | Marfurt et al. ............... | 702/16 |
| 6,055,482 A | * | 4/2000 | Sudhakar et al. ............. | 702/16 |
| 6,092,026 A | * | 7/2000 | Bahorich et al. ............. | 702/16 |
| 6,138,075 A | * | 10/2000 | Yost ............................. | 702/14 |
| RE38,229 E | * | 8/2003 | Marfurt et al. ............... | 702/16 |

FOREIGN PATENT DOCUMENTS

| | | |
|---|---|---|
| EP | 0 626 594 | 11/1994 |
| EP | 0 796 442 | 9/1997 |
| EP | 0 832 442 | 4/1998 |
| WO | WO96/18915 | 6/1996 |
| WO | WO97/13166 | 4/1997 |
| WO | WO97/39367 | 10/1997 |

OTHER PUBLICATIONS

Hellmich et al. (1996) "Image Processing of Seismic Attributes and Geostatistics in the Upper Carbon", DGMK Conference Report (German Society for Petroleum and Coal Chemistry) (Enclosed).

* cited by examiner

*Primary Examiner*—Marc S. Hoff
*Assistant Examiner*—Toan M. Le
(74) *Attorney, Agent, or Firm*—Collard & Roe, P.C.

(57) ABSTRACT

A method is provided for processing a seismic 3-D measurement data set, consisting of a multitude of seismic traces, each having a sequence of amplitude values or data points provided with acoustic impedances. The method consists of the following: selecting a reference section at a predetermined location and depth which comprises neighboring trace sections of several seismic traces; determining the similarity between the selected reference section and localized sections of seismic data from the measurement data set; creating a volume of data which corresponds to the measurement data record, using the similarity value which has been determined and allocated to each data point as the attribute. During processing of the seismic data, the subsurface images are able to be classified by an absolute comparison of the measurement data with a reference sample section as the means of interpretation.

12 Claims, 3 Drawing Sheets

METHOD FOR PROCESSING SEISMIC DATA

CROSS REFERENCE TO RELATED APPLICATIONS

Applicants claim priority under 35 U.S.C. §119 of German Application No. 199 33 717.9 filed Jul. 19, 1999. Applicants also claim priority under 35 U.S.C. §120 of PCT/DE00/02000 filed Jun. 15, 2000. The international application under PCT article 21(2) was not published in English.

BACKGROUND OF THE INVENTION

1. Field of the Invention

The invention relates to a method for processing a seismic 3-D measurement data set comprised of a multitude of seismic traces each having a sequence of data points provided with amplitude values.

2. The Prior Art

Seismic exploration methods are employed worldwide for the purpose of obtaining, in addition to information gained from drilled wells, additional knowledge about geological structures in the subsurface. Owing to the information obtained based on seismic data it is often possible to dispense with further cost-intensive exploration wells, or to limit their number to a minimum.

For seismic surveying of the subsurface, sensors (geophones/hydrophones) are employed, which are lined up successively (2-D seismology), and receive sound waves. Such waves are generated by a seismic source, for example by an explosive charge, by vibrator sources, or by airguns, and partly reflected back to the surface of the earth by the layers of the earth. The waves are registered on the surface by the sensors and recorded in the form of a time series. Such a time series represents the incoming seismic energy by amplitude variations. The time series is stored digitally and consists of uniformly arranged data points (samples), which are characterized by the time and the associated amplitude value. Such a time series is referred to also as a seismic trace. The measurement sequence migrates across the region to be explored, so that a 2-D seismic profile is recorded with such a system.

The goal of the subsequent processing operation is the suppression of noise, for example by stacking or filtering. The results so obtained are vertical profiles in which amplitudes and traveltimes as well as attributes derived from the amplitudes are represented. Such profiles serve as the basis for the further geological interpretation. The geological layers can be observed on a profile by the lateral line-up of the amplitudes.

A three-dimensional data volume is obtained if the data are recorded not along a line but in an areal grid. In the case of the 3-D volume, an amplitude value is assigned to any desired point in the subsurface, the point being described, for example by Cartesian coordinates. The vertical direction is measured in time (sound traveltime).

The measured data are corrected, filtered and, if need be, converted in the course of the data processing. The result is a seismic volume in the form of a 3-D data set that represents the physical properties of the explored subsurface in a seismic image.

It is possible to extract from such a data set any desired sections such as, for example, vertical profiles, and horizontal maps of various subsurface depths, which are then interpreted by geophysicists and geologists in the further course of the exploratory operation. Since such an interpretation of the obtained seismic images substantially comprises a visual correlation, attempts have been made to automate such a subjective interpretation that is depending upon one or more interpreters.

A method for seismic data processing is known from WO 96/18915. In this method, a seismic 3-D volume is divided in a multitude of horizontal slices, which are vertically disposed one on top of the other and spaced from each other, whereby at least one slice is divided in a multitude of cells. In this connection, each cell comprises at least 3 portions of traces whereby the first and the second trace portions are arranged in a vertical plane in the direction of the profiling (=inline), and the third trace portion and the first trace portion are arranged in a vertical plane substantially perpendicular to the direction of the profiling (=crossline). A cross correlation is then carried out between each two trace portions in the two vertical planes. Such a cross correlation supplies inline and crossline values that are dependent on layer dip. Combination of these values in a cell yields a coherency value for the cell that is assigned to a data point of the cell. The final results in turn is a 3-D data volume from which any desired sections can be extracted and displayed.

A method and a device for seismic data processing by means of the coherency characteristics are known from EP 0 832 442 A1, whereby in a manner similar to the method of the patent cited above, a seismic volume is divided in horizontal slices and the latter in turn are divided in cells. The cells have the shape of cubes in the simplest case. Based on the trace portions present in the cells, which amount to at least two in each cell, a correlation matrix is formed as the sum of the differences between inner and outer products of the sets of values from the trace portions. The quotient formed by the highest Eigen value of the matrix and the sum of all Eigen values is then calculated as the measure for the coherency. The result is again a 3-D volume comprised of coherency values.

Furthermore, EP 0 796 442 A1 relates to a method and a device for seismic data processing in connection with which a coherency method based on a semblance analysis is carried out. Similar to the procedure of two methods described above, a seismic data volume is divided in at least one horizontal time slice and the latter is then divided in a multitude of three-dimensional analysis cells, whereby each cell comprises two predetermined lateral directions that are perpendicular to each other, and at least five seismic trace portions that are arranged in the cell next to one another. A semblance value of the trace portions present in the cell is assigned in th respective cell to the corresponding data point. The semblance is in this context a known measure for the conformity between seismic trace portions. The dip and dip direction are determined in this context by scanning different layer dips and dip directions of the analyzed reflector for the best coherency. In addition to the semblance value, the calculated dip data are then displayed for each cell as well.

Furthermore, a method for determining physical properties of the subsurface is known from EP 626 594 A1. In this process, a comparison is carried out between a seismic reference trace recorded at a well location and a reference trace obtained synthetically from log data of a well. Modified synthetic seismograms are subsequently generated that are compared with the other seismic traces. However, only two trace segments are compared to each other, namely one trace segment of a seismic trace and one trace segment of a synthetically generated seismic trace. Lateral environments are consequently not taken into account.

Furthermore, an image processing method is known from the published DGMK (Deutsche Gesellschaft für Mineral ölwissenschaft und Kohlechemie=German Society for Petroleum and Coal Chemistry) Conference Report [1996] "Image Processing of Seismic Attributes and Geostatistics in the Upper carbon" by C. HELLMICH, H. TRAPPE and J. FERTIG. This method permits a quantitative characterization of seismic representations and thus further interpretations of the lithology. Different image processing filters are employed to amplitude maps in this process, and the variations, or the continuity, respectively, of the amplitude values of the closer environment are quantified. The filters represent 2-D multi-trace filters, which are used for taking the local environment around a data point into account. Operators employed for this purpose are the entropy and the dispersion, among others. Maps for the interpretation can be generated for the interpretation with all attributes. The quantities "entropy" or "dispersion" are in this respect measures that quantify the variations or continuities of the amplitude in the local environment.

It has to be emphasized in this context that only relative comparisons in the local environment of a data point are considered in the methods described above. Laterally continuous and gradually changing conditions of the surroundings, for example, are consequently not conspicuous in connection with these processing methods. Even in connection with the implementation according to claim 19 of WO 96/18915, only a relative similarity, i.e. a similarity based on the individual cell is determined first. The similarity values so calculated are compared with similarity values of a volume with a known hydrocarbon reservoir that have been calculated in the same way, and the well location is determined in the newly investigated volume based on the comparison of the coherency values with the coherency values of the volume of the known hydrocarbon reservoir. However, only coherency values relatively determined in a local environment (cell) are included in the comparison in this case as well.

Therefore, the problem of the invention is to propose a method for seismic data processing by which the data are classified across a full volume of measured data according to absolute criteria.

SUMMARY OF THE INVENTION

The problem is solved with a method in accordance with the invention.

If the geological conditions of the subsurface to be explored are known at a location in the region covered by the seismic data volume, for example based on information collected from a well, the similarity of the seismic signals in the entire volume of measured data is determined, using the signal on the location having the known geology. It is assumed in this context that similar geological conditions generate a similar seismic signal in order to transfer in this manner via the similarity determination the geological conditions known in the drilling location to other regions as well, or to find such conditions again there as well, respectively.

It is important to the invention in this connection that the comparison of the local section viewed in each case is carried out with a predetermined reference section that consists of neighboring trace portions of a plurality of seismic traces as well. An absolute reference is created in this way to a reference pattern which, in addition to the temporal extension along a seismic trace (time series) comprises a lateral extension as well.

Therefore, probability statements with respect to geological conditions in the lateral direction can be supplied as well if lateral changes are taken into account in the pattern comparison based on the reference pattern. This means, therefore, that both lateral changes at small scales and, because of the absolute comparison based on a reference pattern, also changes over large distances can be recognized with high probability. However, owing to the absolute comparison with the reference pattern, it is possible also, furthermore, to detect structures that are gradually changing laterally on account of diminishing similarity or similarity increasing again.

The selection of the voluminous section thus offers the advantage that in addition to the vertical distribution of the amplitude information as a characterizing quantity, the lateral change of the seismic signal is taken into account for characterizing the subsurface. It is scientifically explained that by virtue of the knowledge of the lateral change in the geology, it is possible to make statements with respect to the thickness of bodies of sand or to the sedimentologic environment. Motivated by such observations, the similarity of the local seismic data to the global reference is determined for the entire data volume. The dispersion of reference data and local data, for example, is a measure for such similarity, but a mean value-optimized semblance function based on the combined reference and local data is employed as well.

Overall, a classification of the data points of the seismic volume is thus obtained according to absolute criteria.

If the size of the reference section and the local sections is comprised of 3 to 7 data points per dimensional direction, a number of data points is provided that is adequate for the processing of the data, on the one hand. On the other hand, it is possible also to detect small-scale structures in the signal distribution with the help of the analysis. For example, hydrocarbon-bearing layers frequently have a vertical thickness in the seismic signal that is distinctly below 10 samples. It is important in this context that an adequate number of neighboring traces are comprised in the considered sections as well for jointly taking into account in the comparison the lateral characteristic of the environment. So that laterally small-volume changes can be detected here as well, 10 data points at the most should be comprised in each lateral direction as well.

With a 3-D data set of measured data, which is preferably employed, the reference pattern section and the local sections are square stone-shaped sections of the seismic data at the respective location and depth in the simplest case. However, other voluminous forms of the sections are conceivable for 3-D data as well.

If the local sections and/or the reference section are deformed according to a locally preferred dip and preferred dip direction, the sections used for the analysis are adapted to the given geological conditions in a superior manner.

The locally preferred directions are determined, for example, in that, before the determination of the similarity between the reference section and the local sections by an iterative determination of the similarity of neighboring trace portions that are shifted with respect to each other according to dip and dip direction, that specific dip and dip direction for the reference section and each local section is searched for, which results in the largest similarity of the trace portions from the reference section and from each local section.

Alternatively, the dip and dip direction also can be determined by searching during the selection of the reference section for the dip and dip direction exhibiting the largest similarity among the trace portions belonging to the reference section, whereby in the subsequent determination of the similarity between the reference section and local sections, the relative dip between the reference section and each local section corresponding with the largest similarity between the two sections is determined.

In connection with both alternative methods, in addition to the data volume with the similarity values found, a data volume having the determined dip values and a further data volume with the determined values of the dip direction are then additionally formed as the result.

The reference section is preferably selected at a well with ascertained lithological information, so that the geological conditions ascertained by the well may be transferred to corresponding areas of the analysed data volume; which exhibit a large similarity.

A reference section can be formed synthetically by convolving a pre-selected acoustic impedance, for example from the log of the respective well, with a representative wavelet if the quality of the seismic data at the well is impaired, for example due to proximity to a fault. By generating a detailed model, for example by means of geostatistical methods, it is possible to form a reference pattern with any desired complexity. Seismic modeling techniques such as, for example seismic ray tracing, are capable of generating on that basis a seismic reference pattern. This opens the possibility for searching for special situations, for example the pinchout of layers, or fault zones that may be significant to the exploration of reservoirs. This permits the generation of a reference pattern catalogue for 3-D structures. Such a catalogue can be used for assigning local seismic signal characteristics to geological characteristics such as petrological properties, depositional conditions, tectonic features etc. Such an assignment can be carried out for each point in the entire data network. Furthermore, the analysis permits optimization of the data used.

Owing to the fact that the data points are classified in accordance with the determined similarity values, it is possible to achieve an automatic assignment of certain subsurface regions of the analysed measured data set to a certain geological structure.

Owing to the fact that a number of reference sections, for example well locations are compared with the local sections, and a number of similarity values are thus calculated for each data point, it is possible to increase the reliability of the appraisal of the geological conditions in the analysed measured data set. With suitable classification, it is then possible to laterally assign structures that are similar to each other to certain geological conditions found in wells.

The method of the reference patterns described above can be employed also if an acoustic volume generated, for example by a seismic inversion method, is used instead of the seismic data set.

BRIEF DESCRIPTION OF THE DRAWINGS

The invention is described by way of example in the following by reference to the attached figures, in which.

DETAILED DESCRIPTION OF THE PREFERRED EMBODIMENTS

Figure 1:
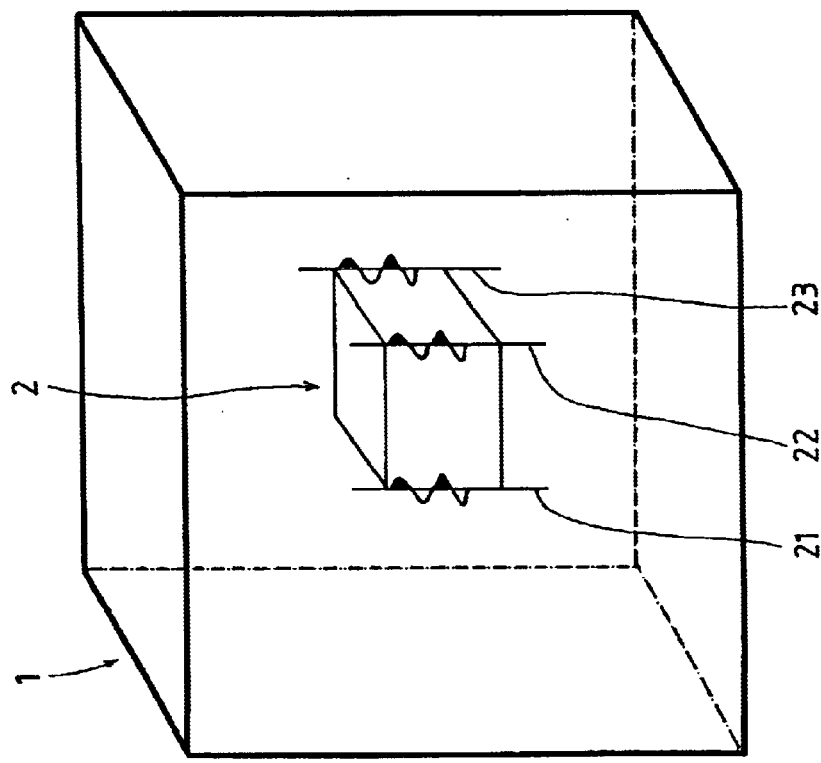
FIG. 1 is a schematic representation of a 3-D data volume with a local section.

FIG. 1 shows a schematic representation of a 3-D data volume 1 comprising a multitude of seismic traces, which are not shown explicitly. A square stone-shaped section 2 is shown in the data volume 1, with three time series in the form of the seismic trace portions 21, 22 and 23 being arranged by way of example on section 2. The local data section 2 preferably comprises three to seven neighboring traces per lateral direction, for example 5×5 traces with a time length of 5 data points (samples) as well, which at a sampling rate of 4 ms thus conforms to a time slice of 20 ms.

Figure 2:
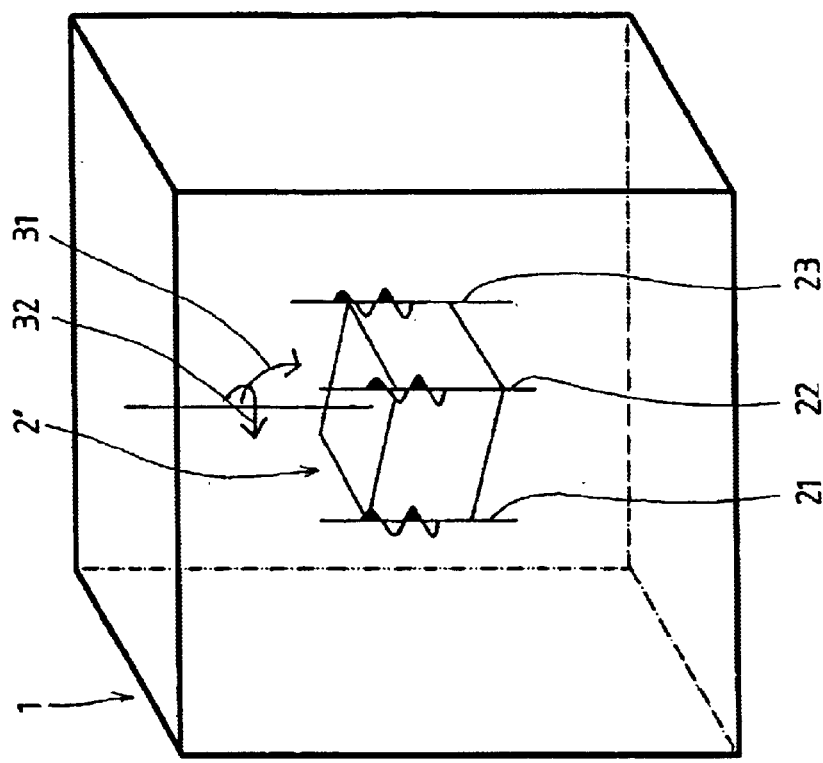
FIG. 2 is a schematic representation of a 3-D data volume with an inclined local data section.

FIG. 2 shows, by a schematic representation corresponding with FIG. 1, a "deformed" data section 2' in the 3-D data volume 1, which is provided also by way of example with three time series in the form of the seismic trace portions 21, 22, 23. The deformation of the local data section 2' reflects in this context the preferred dip 31 and the preferred dip direction 32 determined in the present location and depth range. In accordance with the preferred dip 31 and preferred dip direction 32, the data section shown in FIG. 1 has been formed in a parallelepiped shape.

Figure 3:
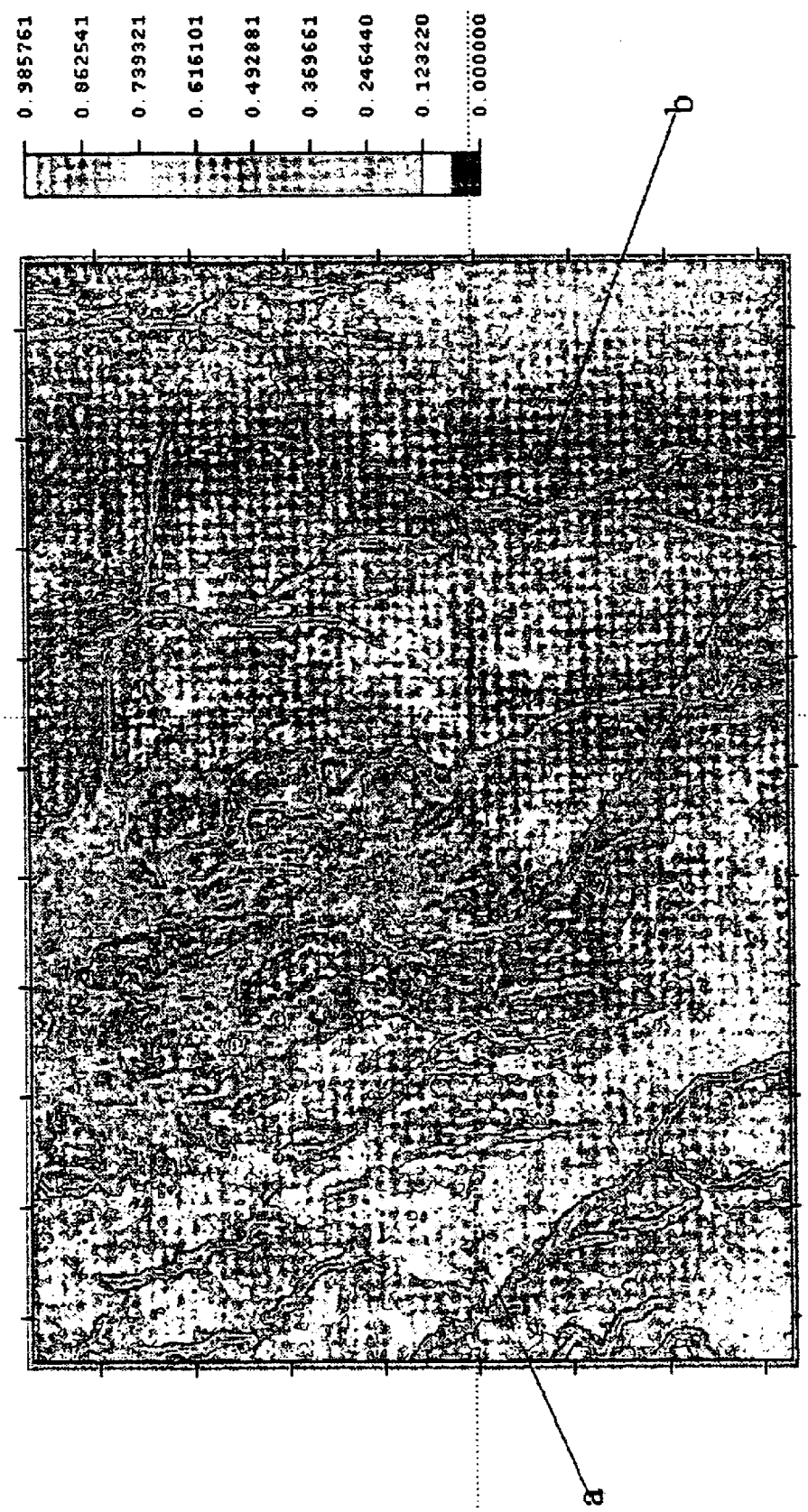
FIG. 3 shows a horizontal section along the interface of a layer from seismic data processed as defined by the invention.

FIG. 3 shows the result of a reference analysis as defined by the invention for a geological horizon with a constant lithology. A slice is cut for this purpose from the 3-D data set along the interface of the layer. Based on the well "a" with the ascertained lithological information, a cube-shaped reference pattern with 3×3×3 data points (samples) was selected in analogy to the section in FIG. 1.

The similarity of local data sections with the reference pattern section was then calculated in the vertical surroundings of the horizon to be analysed. The calculated similarity values are then assigned as attributes to the center point of the local data section viewed at the time, and each local data point that is of interest is taken into account, if necessary across the entire 3-D data set.

The map shows conformity to the highest degree, characterized by the very high similarity values close to 1. The determined similarity values can be related according to the gray scale gradation shown in FIG. 3 on the right. In the present example, it was possible to carry out a verification with the help of the reference well "b", which ascertained the same lithological features of the horizon, namely an anhydride. An exception is the northern part of the analysed region, which is shown in the upper left quarter of the map, which reflects the influences of a salt dome located in the overburden, which exerted a negative influence on the quality of the data. Apart from this disturbed area, linear fault zones are visible.

Figure 4:
FIG. 4 is a horizontal section along another interface of a layer pertaining to the data according to FIG. 3.

On the other hand, FIG. 4 shows a less calm lithology for the same analysis region. The layer interface selected in the present case is assigned to a sandstone horizon which represents a potential reservoir for hydrocarbons. Similarity features were calculated based on a reference pattern section derived from the well "a", whereby, according to a gray scale gradation shown on the right, the similarity values are on a distinctly lower level than those in FIG. 3. While high similarity values are found as expected in the surroundings of well "a", differences appear toward the eastern part of the analysis region, which is shown on the map on the right. In the area of lower similarity, the well "b" encountered a dense sandstone that is not suited as a reservoir horizon. It has to be noted here that some of the fault zones visible in FIG. 3 can be recognized also in the range of said layer interface in FIG. 4.

List of Reference Symbols
1 3-D data set of measured data
2 Local data section
2' Local data section for dipping lithology
21 Seismic trace portion
22 Seismic trace portion
23 Seismic trace portion
31 Preferred dip
32 Preferred dip direction
a Well
b Well
S Gray shade scale

What is claimed is:

1. A method for processing a seismic 3-D measurement data set comprising a multitude of traces, each trace having a sequence of data points provided with amplitude values or acoustic impedances, which comprises the steps of:
   (a) selecting an a global reference section at a predetermined location and depth which comprises neighboring trace portions of several seismic traces;
   (b) determining the similarity between the selected global reference section and local sections of seismic data from the measurement data set and allocating a similarity value based on the determined similarity to each data point; and
   (c) creating a volume of data corresponding with the measurement data set using the similarity value which has been determined and allocated to each data point as the attribute.

2. The method according to claim 1, wherein the size of the global reference section and the local sections comprises 3 to 7 data points per dimensional direction.

3. The method according to claim 1, wherein the local sections and/or the global reference section are deformed according to a local preferred dip and preferred dip direction.

4. The method according to claim 3, wherein during the selection of the global reference section, a search is carried out for the dip and dip direction exhibiting the largest similarity among the trace portions belonging to the global reference section, whereby afterwards in the determination of the similarity between the global reference section and local sections, the specific relative dip between the global reference section and the local section conforming to the largest similarity is then determined in each case.

5. The method according to claim 4, wherein in addition to the data volume with the similarity values, a data volume with the determined dip values and a further data volume with the determined values of the dip direction are formed.

6. The method according to claim 1, wherein the global reference section is supplied by a well with ascertained lithological information.

7. The method according to claim 6, wherein the global reference section is generated synthetically by convolving down a pre-selected 3 dimensional acoustic impedance distribution from the relevant well log with a representative wavelet.

8. The method according to claim 6, wherein the global reference section is formed synthetically with the help of seismic 3-D modeling techniques from a geological model determined by lithological, petrophysical and/or structural parameters.

9. The method according to claim 1, wherein several different global reference sections, given by locations of drilled holes, are compared with the local sections each in separate similarity analyses, and thus several similarity values are calculated for each data point.

10. The method according to claim 3, wherein the method comprises before the step of determining the similarity between the global reference section and said local section, the step of searching for a specific dip and dip direction for the global reference section and each local section which results in the largest similarity of the trace portions from the global reference section and each local section, whereby the search comprises an iterative determination of the similarity of neighboring trace portions that are shifted with respect to each other according to dip and dip direction.

11. The method according to claim 1, wherein said step of determining similarity includes determining the similarity between several different global reference sections which are compared with the local sections, and thus several similarity values are calculated for each data point.

12. A method for processing a seismic 3-D measurement data set comprising a multitude of traces, each trace having a sequence of data points provided with amplitude values or acoustic impedances, which consists of the following steps:
   (a) selecting a global reference section at a predetermined location and depth which comprises neighboring trace portions of several seismic traces;
   (b) determining the similarity between said selected global reference section, and each of a plurality of local sections of seismic data taken from the measurement data set;
   (c) creating a new data set by assigning the calculated similarity values as attributes to the center points of each of the local sections, thus creating a volume of data or similarity attributes corresponding to the measurement data set with the determined similarity values assigned to each data point in said new data set.

* * * * *